US010043085B2

(12) United States Patent
Dejewski et al.

(10) Patent No.: US 10,043,085 B2
(45) Date of Patent: Aug. 7, 2018

(54) FRAMEWORK FOR ANALYSIS OF BODY CAMERA AND SENSOR INFORMATION

(71) Applicant: International Business Machines Corporation, Armonk, NY (US)

(72) Inventors: Donald P. Dejewski, North Massapequa, NY (US); Romelia H. Flores, Keller, TX (US); Hung T. Kwan, Grand Prairie, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/334,018

(22) Filed: Oct. 25, 2016

(65) Prior Publication Data

US 2018/0114081 A1 Apr. 26, 2018

(51) Int. Cl.
*G06K 9/00* (2006.01)
*H04L 12/24* (2006.01)
*H04L 29/08* (2006.01)

(52) U.S. Cl.
CPC ..... *G06K 9/00892* (2013.01); *G06K 9/00771* (2013.01); *G06K 2009/00939* (2013.01); *G06K 2009/00946* (2013.01); *H04L 41/22* (2013.01); *H04L 67/12* (2013.01)

(58) Field of Classification Search
CPC .......... G08B 25/001; G08B 25/016; G08B 13/19621; G08B 13/19676; G08B 29/188; G08B 6/00; H04B 1/385; H04N 5/28; H04N 5/77; H04N 5/2251; H04N 5/2252; H04N 5/772; H04N 5/907; H04N 9/802;

(Continued)

(56) References Cited

U.S. PATENT DOCUMENTS 9,159,371 B2  10/2015  Ross et al.
9,253,452 B2   2/2016  Ross et al.
2013/0314537 A1 11/2013 Haler et al.
(Continued)

OTHER PUBLICATIONS

Peter Mell et al., "The NIST Definition of Cloud Computing", National Institute of Standards and Technology, U.S. Department of Commerce, NIST Special Publication 800-145, Sep. 2011, 7 pages.

*Primary Examiner* — Tom Y Lu
(74) *Attorney, Agent, or Firm* — Heslin Rothenberg Farley & Mesiti P.C.

(57) ABSTRACT

A method, computer program product, and system for initiating a responsive action to environmental factors, include a processor monitoring biometric data and movements of an individual obtained from one or more sensors proximate to the individual, to establish and continuously update, a baseline state for the individual. The processor obtains video data and audio data from a recording device worn by the individual and contemporaneous data from the one or more sensors. The processor determines, based on the contemporaneous sensor data and the baseline state, that the individual is experiencing a state inconsistent with the baseline state. The processor analyzes the video data and the audio data to identify environmental factors contributing to the state inconsistent with the baseline state. Based on identifying the environmental factors, the processor determines a responsive action to mitigate the environmental factors and initiates the responsive action.

16 Claims, 9 Drawing Sheets

(58) Field of Classification Search
CPC .... H04N 9/8205; H04W 48/18; H04W 4/005; H04W 4/02; H04W 52/026
See application file for complete search history.

(56) References Cited

U.S. PATENT DOCUMENTS

| | | |
|---|---|---|
| 2014/0368658 A1 | 12/2014 | Costa et al. |
| 2016/0042767 A1 | 2/2016 | Araya et al. |
| 2016/0065908 A1 | 3/2016 | Chang et al. |
| 2016/0119667 A1 | 4/2016 | Layson, Jr. et al. |
| 2016/0136882 A1* | 5/2016 | Cobbett ............... A61B 5/0205 156/218 |
| 2016/0182850 A1* | 6/2016 | Thompson ........... H04N 9/8205 348/158 |
| 2016/0286156 A1* | 9/2016 | Kovac .................... H04N 5/772 |
| 2017/0257129 A1* | 9/2017 | Egner .................... H04B 1/385 |

\* cited by examiner

200

| Baseline | Officer 1 |
|---|---|
| Normal Heart rate | 70 |
| Stress Heart rate | 120 |
| Walking heart rate | 130 |
| Walking speed | 4 mph |
| Running Speed | 10 mph |

On Patrol

| Time | Audio | Video | Speed | Heartrate | Relationship and action |
|---|---|---|---|---|---|
| 0800-0830 | no | no | n/a | n/a | no audio, no video ... no event occurring |
| 0830-0835 | yes | yes | 0 | | Audio/Video on |
| 0830-0831 | yes | yes | | | HR increasing |
| 0831-0832 | yes | yes | | | Speed increasing, HR at Stress level (from baseline) |
| 0832-0833 | yes | yes | | | Speed increasing, HR at Stress level |
| 0834-0835 | yes | yes | | | HR decreasing, Rate decreasing .. event under control |
| 0835-0836 | yes | yes | 0 | | HR decreasing, no speed |
| 0837-0838 | no | no | 0 | | event ended |

FIG. 3

FRAMEWORK FOR ANALYSIS OF BODY CAMERA AND SENSOR INFORMATION

BACKGROUND

Body cameras worn by law enforcement during the course of duty provide the law enforcement officer's view of an event, including the circumstances surrounding the event. Put plainly, the camera sees what the officer sees. But although a body camera can provide both audio and video data related to an event, there is information missing in this recorded account, including whether the officer is under stress, whether the officer is moving, in what direction is the officer is moving, and the speed of the officer's movement.

SUMMARY

Shortcomings of the prior art are overcome and additional advantages are provided through the provision of a method for initiating a responsive action based on environmental factors. The method includes, for instance: monitoring, by one or more processors, biometric data and movements of an individual obtained from one or more sensors proximate to the individual, to establish and continuously update, a baseline state for the individual; obtaining, by the one or more processors, video data and audio data from a recording device worn by the individual and contemporaneous data from the one or more sensors; determining, by the one or more processors, based on the contemporaneous sensor data and the baseline state, that the individual is experiencing a state inconsistent with the baseline state; analyzing, by the one or more processors, the video data and the audio data to identify environmental factors contributing to the state inconsistent with the baseline state; based on identifying the environmental factors, determining, by the one or more processors, a responsive action to mitigate the environmental factors; and initiating, by the one or more processors, the responsive action.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 2 depicts certain aspects of an embodiment of the present invention;

FIG. 3 depicts certain aspects of an embodiment of the present invention;

DETAILED DESCRIPTION

Figure 1:
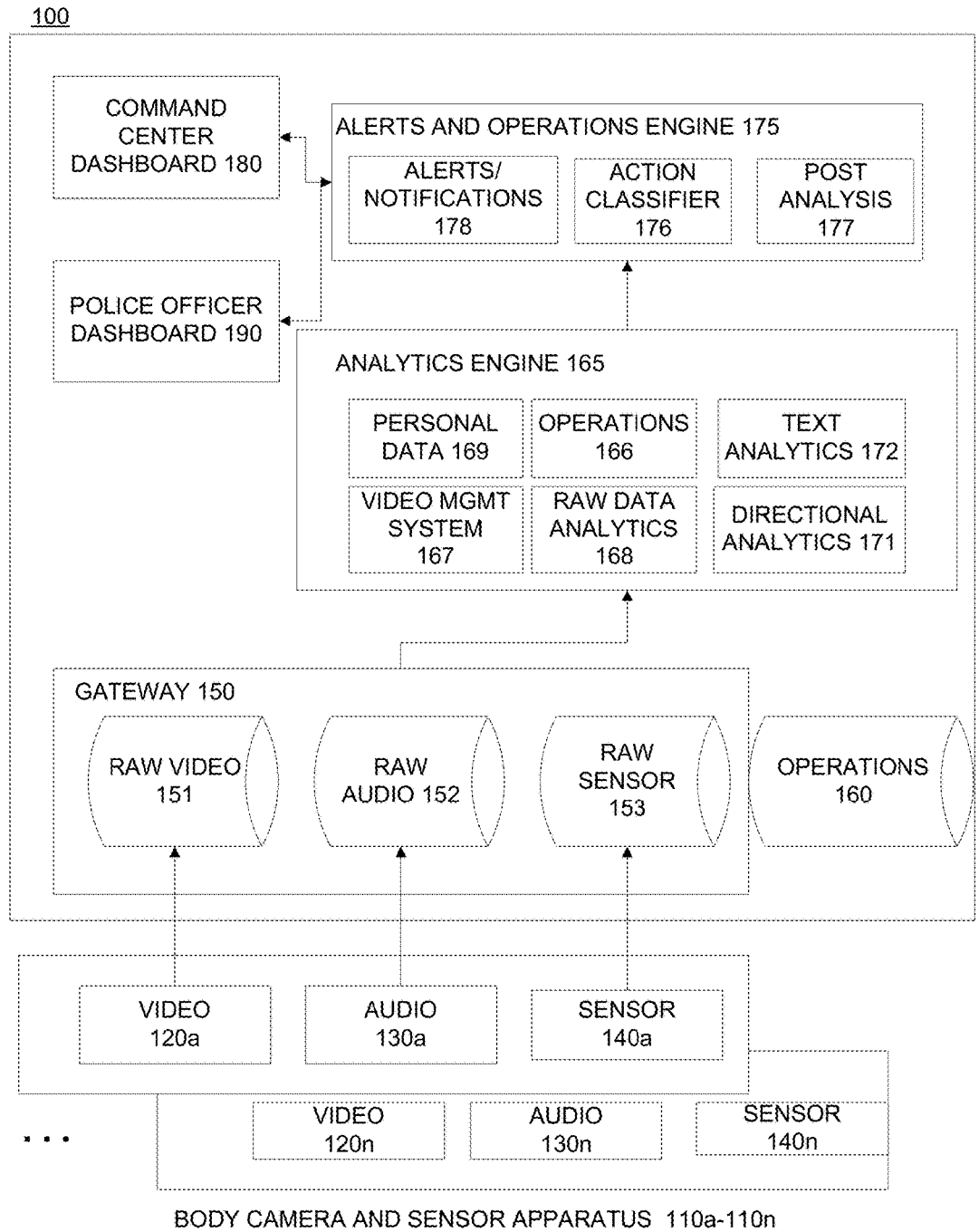
FIG. 1 depicts elements of a technical architecture into which aspects of an embodiments of the present invention are implemented.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 8:
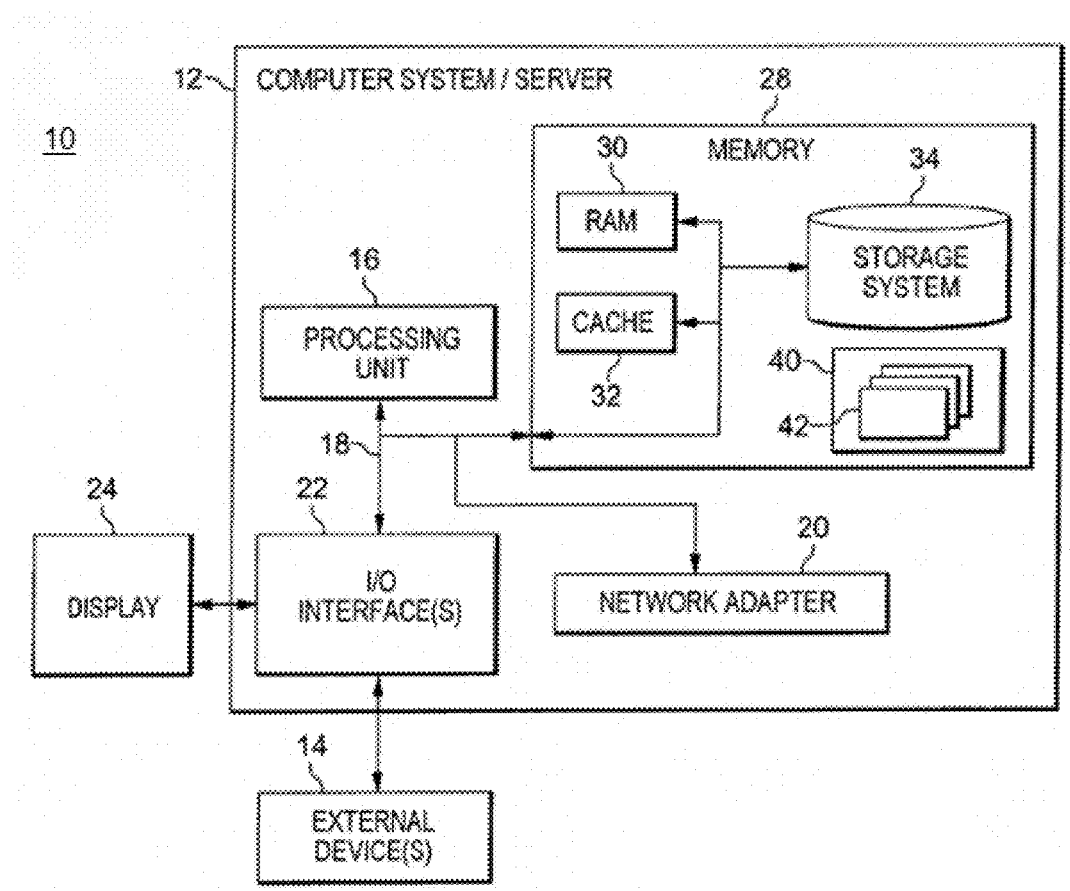
FIG. 8 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 8 as program/utility 40, having a set (at least one) of program modules 42, may be stored in memory 28.

In order to address shortcomings in existing body camera systems, such as the fact that they capture very limited data, i.e., just audio and video, embodiments of the present invention provide an integrated framework which leverages the analytics and insights provided by the addition of sensors, which enable proactive notification and alerting in specific situations. Many examples herein focus on the applicability of embodiments of the present invention in law enforcement. In fact, the use of certain aspects embodiments of the present invention specifically by police officers are utilized herein to illustrate the functionality and advantages of these aspects. However, as understood by one of skill in the art, law enforcement is an example of one setting where the utility of embodiments of the present invention can be realized; the unique combination of sensor data with audio and visual footage, both to gain a better understanding of an event and to facilitate responses, based on analyzing the data, can be utilized in a variety of environments.

Embodiments of the present invention take a proactive approach to monitoring an individual potentially engaged in a stressful event. In an embodiment of the present invention, one or more programs (executing on at least one processing circuit): 1) correlate heart rate and speed of an individual to a baseline; 2) identify a physiological difference between expected values and received values; and 3) take and/or recommend an action. One or more programs in an embodiment of the present invention identify a possibility of an event to alert, identify that an event is occurring, and then act upon that information by dispatching assistance, and save critical video data for post analysis and critical learning for the system and users of the system.

As will be discussed in greater detail below, embodiments of the present invention include a computer system, a computer program product, and a computer-implemented method for augmenting video and audio data obtained during an event, for example, camera feeds (e.g., raw data from body cameras) with information that is obtained from sensors (e.g., compass, accelerometers, GPS, body monitoring sensors, etc.) during the same event. In an embodiment of the present invention, program code executing on at least on processing circuit provides analytics based on a combination of the audio and video data (e.g., from a video camera feed), sensor information, and operational procedures of an organization and utilizing the analytics to facilitate actions based on the event. The program code also creates a graphical user interface (GUI), such as a dashboard, to display results of its analytical analysis and to enable users to monitor events in real-time.

In an embodiment of the present invention, the program code executing one or more computing node (e.g., FIG. 8, 10), based on analyzing data provided by recording devices and sensors, generates and transmit notifications and/or instructions, including but not limited to: notifications to additional police resources, including officers, notifications to an operational center to monitor the situation, and/or a command center to dispatch additional resources. Thus, aspects of embodiments of the present invention represent an improvement to personal recording device because unlike existing body camera systems, which include passive recording devices, from which footage is most useful for analysis after an event, embodiments of the present invention include body camera devices that are real-time analysis and notification systems, with one or more programs that act in real-time to mitigate a given event, as it is happening. Based on information collected and analyzed by aspects of the present invention, program code in the invention transmits alerts, sends instructions to dispatch personnel, and provides comprehensive views of the integrated data, for example, on a command center's dashboard. This improvement to body camera devices is inextricably tied to computing and represents an improvement to previous computing technologies in this area.

Aspects of certain embodiments of the present invention include a framework, comprised on one or more computing nodes (e.g., FIG. 8, 10), with one or more processors, executing one or more programs that obtain and analyze information, that determines relationships between the data and provides these determinations in a way that enables and/or triggers a response to events depicted in the data.

Advantages of embodiments of the present invention are realized in a law enforcement environment. For example, in a policing situation, one or more programs utilizing data from a body camera system of an embodiment of the present invention provide police officers with additional insight into a recorded event, which will increase the safety of the personnel wearing the apparatus. The program code configures data from the recording devices and the sensors in a GUI (e.g., a dashboard). Command center personnel utilize the dashboard to monitor events and ensure appropriate operations are occurring. In an embodiment of the present invention, program code provides dashboard views that correlate data from one or more individuals wearing body cameras and sensors.

Embodiments of the present invention provide a more complete view of real-time situational awareness than existing passive recording systems. For example, one or more programs may automatically generate alerts or recommend actions to users, including through a centralized communications hub, such as a command center. Utilizing the diverse data recorded at a scene, the program code can provide a more complete view of evidence utilized in investigations. Also, based on analysis of the collected data, one or more programs may automatically trigger operational procedures to coordinate with the aforementioned command center and surrounding first responders. The operational procedures include generating automatic requests for backup over a communications network, including the Internet.

FIG. 1 is a technical architecture of an embodiment of the present invention. For ease of understanding, individual functionalities provided by one or more programs executing by one or more processing resources are separated into individual modules. These modules are merely one example of a possible distribution of aspects of an embodiment of the present invention and this embodiment is illustrated as modules merely for clarity.

An embodiment of the present invention, referred to herein as both a framework and a body camera analytics system 100, includes at least one body camera and sensor apparatus 110a-110n (that can be comprised of one or more physical units), that is worn by an individual. Each camera and sensor apparatus 110a-110n includes one or more recording devices to capture video data 120a-120n, audio data 130a-130n, and sensor data 140a-140n. A camera and sensor apparatus may also be equipped with a streaming capability. Program code of the camera and sensor apparatus 130a-130n executing on a processing circuit, such as a microprocessor (not pictured), receives audio data 130a-130n and video data 120a-120n, from the vantage point of the wearer, and collects sensor data 140a-140n based on the experiences and actions of the wearer. Sensors utilized in embodiments of the present invention can include sensors available on a typical body worn devices, or embedded in personal computing devices.

Sensor data 140a-140n may include biometric values for the wearer, the physical location of the wearer, the direction of movement of the wearer, and/or the pace of movement of the wearer. The sensors in an embodiment of the present invention that collect the sensor data 140a-140n may be both active and/or passive sensors. In an embodiment of the present invention, to collect sensor data 140a-140n from passive sensors, a program queries the sensors at fixed intervals to collect sensor data 140a-140n. Meanwhile, active sensors in embodiments of the present invention provide the sensor data 140a-140n in real-time to a gateway 150, which collects and aggregates the raw data.

In an embodiment of the present invention, the camera and sensor apparatus 110a-110n is mounted on the outerwear of a wearer, such as a police officer. The camera portion of the apparatus may include a traditional recording device for both audio data 130a-130n and video data 120a-120n. In an embodiment of the present invention, the sensor data 140a-140n captured by the sensors and/or program code executing on a processing circuit of the apparatus captures the pulse and direction of the wearer. Data captured by a camera and sensor apparatus 110a-110n may include, but is not limited to: audio data, video data, the heart rate of the wearer, and/or the direction of the wearer.

In an embodiment of the present invention, the program code transmits the video data 120a-120n, audio data 130a-130n, and sensor data 140a-140n, from each camera and sensor apparatus 110a-110n to a gateway 150. In an embodiment of the present invention, the data transmitted (e.g., over a wireless connection, such as the Internet) is raw data and program code captures all the raw data in real-time from the police officer's body camera and sensors. One or more programs collecting the data at the gateway 150 receive the data and monitor and/or query the camera and sensor apparatus 110a-110n to obtain the data. The video data 120a-120n, audio data 130a-130n, and sensor data 140a-140n obtained at the gateway 150 may include, but is not limited to, real-time audio/video feeds, and sensor data, from one or multiple cameras.

In an embodiment of the present invention, the gateway 150 obtains the data and stores the data in one or more data repositories 151-153. By way of example, FIG. 1 illustrates an embodiment where the gateway 150 includes separate databases for each type of raw data: video 151, audio 152, and sensor 153. Further embodiments may include one or more repositories. In embodiments of the present invention the one or more databases 151-153 may include traditional relational databases, Hadoop, and/or Object Storage.

In an embodiment of the present invention, the program code stores a variety of data in the repositories 151-153 in the gateway 150. The program code may store sensor data 140a-140n that includes the direction, speed, and heart rate of a wearer of the camera and sensor apparatus 110a-110n. In an embodiment of the present invention, the program code stores personalized information about a given wearer, including a baseline for heartrate, speed, and audio, and times when the individual wore the camera and sensor apparatus 110a-110n (e.g., law enforcement shifts worked, start date, etc.). The program code can store the personalized information over time and update, when appropriate, based on raw data received and/or user inputs into the system 100. FIGS. 2-3, which are discussed later, demonstrate how this personalized information is stored and utilized in an embodiment of the present invention.

In an embodiment of the present invention, program code executing on a processing circuit can compare the raw data with data defining expected behaviors of individuals wearing the camera and sensor apparatus 110a-110n. The expected behaviors can be understood as existing operational processes that are provided to individuals utilizing the camera and sensor apparatus 110a-110n in certain situations. For example, when a wearer of the camera and sensor apparatus 110a-110n is a police officer, an expected behavior is a sequence of steps in an operational process that the police officer is expected to follow when responding to a particular type of event. One or more programs in an embodiment of the present invention can compare contemporaneous data from an event with operational processes for this type of event to validate whether the individual reacted in an appropriate manner. In an embodiment of the present invention, the operational processes are stored in a data repository 160, which may be a separate or overlapping repository with the repositories 151-153 that comprise the gateway 150.

Embodiments of the present invention include an analytics engine 165 that is comprised of one or more programs that analyze data to determine whether actions are warranted based on the data. Determinations by the analytics engine 165 are utilized by programs in the alerts and operations engine 175 to generate and transmit, to desired destinations, alerts and/or notifications. In FIG. 1, which, for illustrative purposes, is adapted to show aspects of the present invention in use in a law enforcement environment, program code in the alerts and operations engine 175 transmits alerts and notifications to a police officer dashboard 190 (a graphical user interface (GUI) on a computing device utilized by a police officer) and/or a command center dashboard 180 (a GUI on a computing device at a centralized emergency response coordination location).

In an embodiment of the present invention, one or more programs of the analytics engine 165 receive and analyze data from the gateway 150 and the operations repository 160. For example, the one or more programs interpret the raw video, audio and sensor information by compiling contemporaneous data based on timestamps and correlating the data with operational processes in the repository 160. The analytics engine 165 may include programs comprising a video management system 167 that handles the audio/video processing and can be augmented by video analytics to search the video for objects of interest (e.g., a yellow vehicle, a person with glasses, etc.).

By identifying contemporaneous video, sensor, audio, and text data and correlating the data (e.g., utilizing time stamps), the program code of the analytics engine 165 generates a total analytics picture of the actual event at specific times. Based on the total analytics picture, the one or more programs determine whether certain thresholds are met or exceeded and trigger action or alerts, based on these thresholds. Whether a threshold is met, for example, for stress, can be dependent upon the state of the individual wearing the body camera and sensor apparatus 110a-110n, as resting states, which evidence expected biometrics, can differ between individuals. Thus, programs in the analytics engine 165 can analyze the personal data 169 (e.g., historical data) of an individual to determine whether a threshold is met. The personal data 169 may include, but is not limited to, historical, predictive and actual health readings of the individual (heart rate, etc.) collected from biometric sensors in the body camera and sensor apparatus 110a-110n. In an embodiment of the present invention, programs in the analytics engine 165 automatically capture biometric data (e.g., from the gateway 150) and determine the normal states (rest state) of individuals. The program code may also perform analysis of data across multiple police officers in particular locations and determine patterns across multiple police officers.

To determine whether an individual is experiencing stress, certain embodiments of the present invention utilize historical biometric data about the individual, based on real-time readings from biometric sensors in the body camera and sensor apparatus 110a-110n, as compared to the historical readings, to determine the state of the wearer. For example, based on retaining historical sensor readings that represent a wearer in a restful state (i.e., exhibiting normal operational patterns), program code executing on a processing resource of a computing node in the embodiment determines, based on sensor data 140a, that the wearer is in a stressed state. The program code may make this determination based on sensor readings related to heartbeat, direction, blood pressure, movement, etc., when contrasted with the wearer's historically preserved restful state.

Some embodiments of the present invention determine the stress level of a user by monitoring the movement of the user through motion and direction detection sensors. Sensors included in embodiments of the framework that monitor motion can include a gyroscope, an accelerometer, location services (e.g., global positioning systems), and/or any motion detection sensors. By continuously tracking the movement of an individual using the sensor data, one or more programs in an embodiment of the present invention provide data that can be utilized to analyze the actions at various times throughout an event. Analysis of these movements can assist the wearer, after the event, in understanding what additional actions, precautions or recommendations the individual should have or could have taken during the event in order to alter the outcome of the event. For example, from the movements of the wearer, the program code can determine whether the user is in a stressful state, including by capturing and analyzing the motion of the wearer (e.g., whether the wearer is running, walking, jogging or at a standstill, which direction is the wearer is moving in).

Embodiments of the present invention utilize a combination of sensors that monitor a wearer and audio and video capture devices to gain a full understanding of an event. For example, a program may receive data from a sensor indicating that a wearer's heart rate has increased. Based on this data and additional data obtained through the body camera and sensor apparatus 110a-110n, the program code can determine the basis for this elevated heart rate, for example, whether the increase is based on stress on based on the wearer's movement (e.g., running). If the user is running, embodiments of the present invention can determine the direction in which the wearer is running relative to the path of a suspect that the wearer is pursuing.

In an embodiment of the present invention, programs in the analytics engine 165 also analyze data received to produce directional analytics 171, analytics showing the direction and speeds of an individual prior to and during an event. The programs additionally may determine text analytics 172, analytics that provide content and contextual analytics, by transcribing and analyzing audio data. A program in the analytics engine 165 can forward one or more of the directional analytics 171 and the text analytics 172 related to a given event to the alerts and operations engine 175, so that this data is transmitted to responders, for example, by populating the information on the command center 180 and police officer dashboards 190.

FIG. 2 is an example of a baseline 200 that the program code in an embodiment of the present invention (e.g., in the analytics engine 165) may generate and retain as personal data 169. The baseline values in this non-limiting example of a baseline 200 include a normal heart rate, a stress heart rate, a walking heart rate, a walking speed, and a running speed. Thus, the baseline 200 in this example relates both to biometrics as well as to movement.

FIG. 3 is an example of an analysis 300 performed by the program code when comparing the baseline 200 (FIG. 2) to activity of an individual during a given time period. As seen in this example, the program code monitors whether audio data and video data is available in addition to the speed, heart rate, and stress level of the individual. When a threshold is exceeded, as indicated by the baseline, the program code can take an action, such as sending a notification. This example includes conclusions reached by the program code as a result to changing conditions of the individual.

Returning to FIG. 1, embodiments of the present invention can be preconfigured to recognize certain situations and respond in a pre-determined manner. For ease of understanding, these examples are explained in the context of a police officer wearing a body camera and sensor apparatus 110a-110n. For example, when the system 100 receives audio data at a high audio volume, sensor data indicating rapid movement, and biometric data showing a heart rate increase for more than one police officer, one or more programs determine that these conditions indicate that a chase is under way involving multiple officers. In this situation, the program sends a high alert notification, e.g., a "red" alert notification. In another example, the programs receive high volume audio from multiple police officers without contemporaneous movement data, and determine that a situation is commencing, but has not yet escalated. The program then sends a cautionary alert notification, e.g., a "yellow" notification. In another example, the programs receives high audio, but no rapid movement data and no heart rate increase indications for one police officer. Based on this data, the program code determines that there is no need for an alert because the individual could be in a crowded area and the program code therefore does not send an alert.

As aforementioned, in an embodiment of the present invention, the programs in the analytics engine 165 communicate with programs in the alerts and operations engine 175 to request an alert or notification. Thus, the alerts and notifications engine 175 receives, prioritizes and processes requests for alerts and/or notifications from the analytics engine 165. Programs in the alerts and operations engine 175 determine how to send alerts and notifications. For example, programs illustrated as the action classifier 176 determine the next steps for the wearer in a given situation, based on the analytics engine 165 analyzing the video data 120a-120n, audio data 130a-130n, and sensor data 140a-140n, from each camera and sensor apparatus 110a-110n, received from the gateway 150, and from the operational process data stored in a data repository 160. One or more programs in the alerts and operations engine 175 may also utilize operations 166 data, pulled by programs in the analytics engine 165 from data repository 160 and the raw data 151-155 to determine how to display pertinent data and provide recommendations, for example, for dispatching additional resources in a particular area, as part of the alert and/or notification.

In an embodiment of the present invention, via both user entry and continued monitoring, receipt, and analysis, of data from each camera and sensor apparatus 110a-110n, one or more programs in the alerts and operations engine 175 receive and store information data after a notification or action is taken in a post analysis repository 177. Programs in this framework utilize the information captured in the post analysis repository 177 to update processes in the analytics engine 165 and in the operations repository 160. Thus, embodiments of the present invention include a machine learning capability.

In an embodiment of the present invention, one or more programs illustrated in FIG. 1 as the alerts/notification engine 178 (in the alerts and operations engine 175), issue alerts and/or notifications. These programs may utilize different identifiers to distinguish the severity of an alert. For example, as noted in the examples provided, red alert may signify that an event is happening and assistance is required while a yellow alert in a notification that an event has a likelihood of expanding to an urgent event.

In an embodiment of the present invention, the one or more programs of the alerts/notification engine 178 (in the alerts and operations engine 175) transmits an alert and/or notification to a computing node utilized by a user. Two possible graphical user interfaces are illustrated in FIG. 1 to display these alerts and/or notifications to a user, a command center dashboard 180 and a police officer dashboard 190. These dashboards may display different portions of the information based on the user experience.

Returning to FIG. 1, a command center dashboard 180 can provide a broader as well as a more granular view of data. For example, in an embodiment of the present invention, the program code generates a view of all individuals equipped with a body camera and sensor apparatus 110a-110n who are located within a certain proximity of a given user regarding whom the alert or notification pertains, for display on the command center dashboard 180. The program may indicate the stress level of each individual displayed, for example, using colors, red or green. Additionally, the program code may provide functionality enabling a user of this command center dashboard 180 GUI to drill down into specific information about an event occurring or particular officers at an event.

In an embodiment of the present invention, the program code provides a personalized view for a given officer on a police officer dashboard 190. Thus, the police officer dashboard 190 provides a visual representation of a particular officer's current situation as compared to a prior baseline. This visual display may include a mapping capability that this individual can utilize to locate one or more additional officers. The user may also utilize the police officer dashboard 190 to view the images from his or her body camera and sensor apparatus 110a-110n.

Notifications may also relate to environmental factors obtained based on the program code's analysis of the body camera and sensor apparatus 110a-110n data. Embodiments of the present invention can provide details related to an event that a wearer is involved in, including actions occurring and environmental factors. For example, the body camera and sensor apparatus 110a-110n can also capture video that a program in an embodiment of the present invention can utilize to detect particular dangers, including objects such as weapons, in the environment of the wearer. Based on detecting a danger, in an embodiment of the present invention, the program code determines that assistance is required and communicates with one or more entities who could provide assistance. Embodiments of the present invention include program code that determines, based on data received through the gateway 150, if a wearer is chasing someone, being attacked, speaking with someone, and/or hiding from someone. Program code in an embodiment of the present invention utilizes this data to determine appropriate additional resource requirements so that the alerts/notification engine 178 can take an appropriate action.

Aspects of embodiments of the present invention can be integrated with off-the-shelf devices and existing systems. For example, program code in an embodiment of the present invention accesses data collected by personal devices that monitor an individual, such as commercial products that track activity, such as steps taken, exercise and calories burned and utilize this data when determining whether to send an alert or a notification. Program code in an embodiment of the present invention can collect environmental data for use in analysis of an event from existing security systems and sensors at a physical location of an individual wearing the body camera and sensor apparatus 110a-110n.

Figure 4:
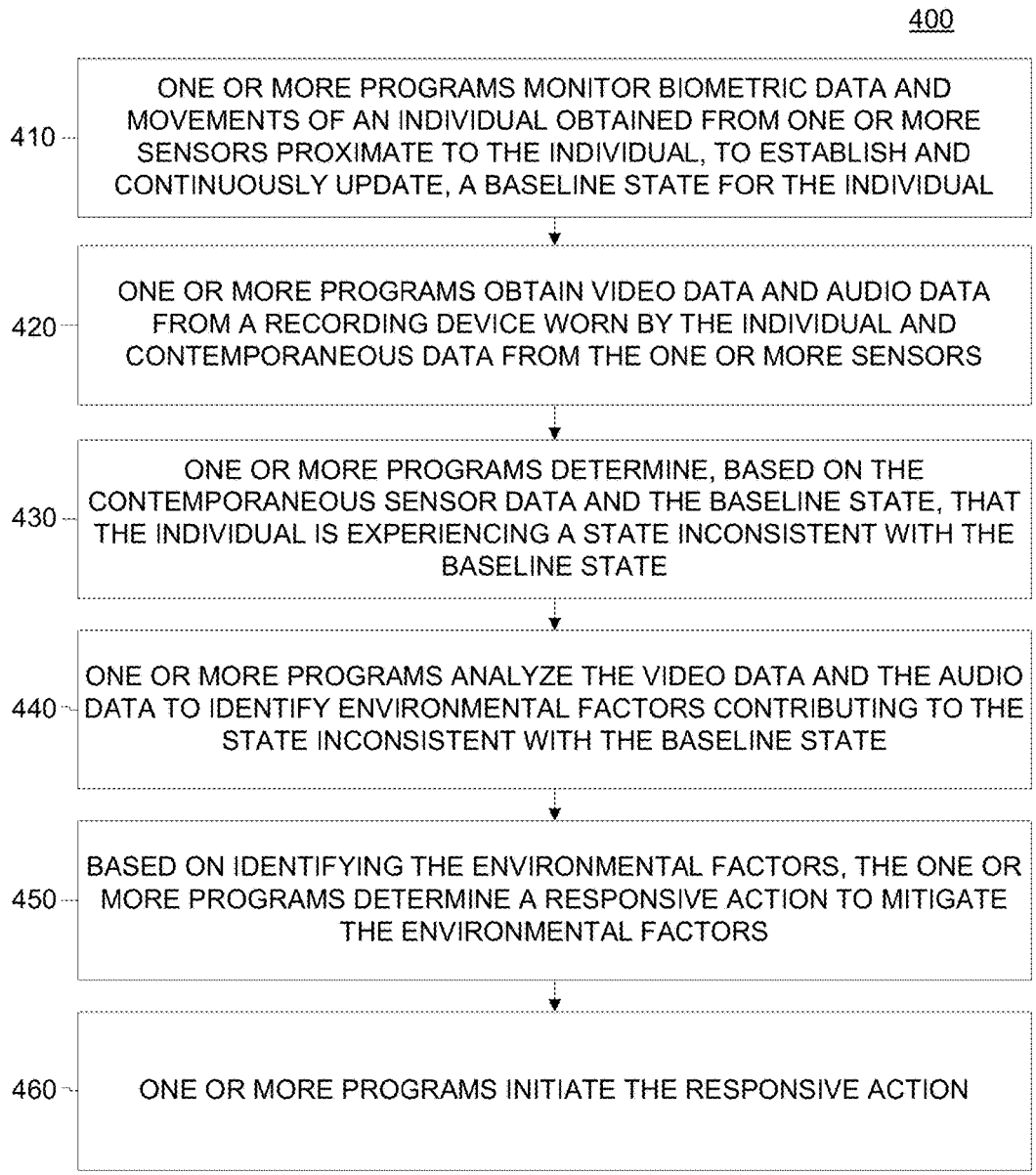
FIG. 4 is a workflow illustrating certain aspects of an embodiment of the present invention.

FIG. 4 is a workflow 400 illustrating certain aspects of some embodiments of the present invention. In an embodiment of the present invention, program code executing on at least one processing circuit monitors biometric data and movements of an individual obtained from one or more sensors proximate to the individual, to establish and continuously update, a baseline state for the individual (410). The biometric data may include the heart rate of the individual, the body temperature of the individual, and/or the blood pressure of the individual. In an embodiment of the present invention, the baseline state is a resting state for the individual.

The program code obtains video data and audio data from a recording device worn by the individual and contemporaneous data from the one or more sensors (420). The program code determines, based on the contemporaneous sensor data and the baseline state, that the individual is experiencing a state inconsistent with the baseline state (430). In an embodiment of the present invention, a state inconsistent with the baseline state represents a high stress state. The program code may determine that the individual is experiencing a high stress state based on the contemporaneous data exceeding a threshold established by the baseline state. In an embodiment of the present invention, the contemporaneous sensor data includes biometric data and data characterizing movements of the individual and the program code determine that the individual is experiencing a state inconsistent with the baseline state by analyzing the biometric data to determine, based on the baseline data, if at least one biometric value in the additional biometric data is inconsistent with the baseline data and analyzing the data characterizing the movements to determine if the at least one biometric value is an outlier or if at least one biometric value is indicative of the environmental factors.

The program code analyzes the video data and the audio data to identify environmental factors contributing to the state inconsistent with the baseline state (440). Based on identifying the environmental factors, the program code determines a responsive action to mitigate the environmental factors (450).

The program code initiates the responsive action (460). In an embodiment of the present invention, initiating the responsive action includes the program code transmitting, over a network connection, to a client, a request for the responsive action, and configuring the request for display in a customized graphical user interface on the client. For example, the responsive action may be sending backup and the request could be a request for backup.

In an embodiment of the present invention, the program code identifies based on the video data, the audio data, and the contemporaneous data (from the individual), additional individuals in a given vicinity of the individual. In this embodiment, the program code initiates a responsive action by transmitting a request for the responsive action, over a network connection, to clients associated with the additional individuals.

In an embodiment of the present invention, the program code continues to monitor the individuals, utilizing the recording device and the sensors, during the responsive action. Based on monitoring the responsive action, the program code may configure and display, in the customized graphical user interface, data obtained during the response action from the recording device and the sensors. The program code may also retain data gathered during the responsive action as historical data in a memory and index the data gathered by the environmental factors in the memory. The program code may utilize this historical data going forward to determine responsive actions. The program code, in an embodiment of the present invention, determines the responsive action by analyzing one or more of operational procedures or the historical data to select the responsive action based on the environmental factors.

Figure 5:
FIGS. 5-7 are screenshots of graphical user interfaces in some embodiments of the present invention.
Figure 6:
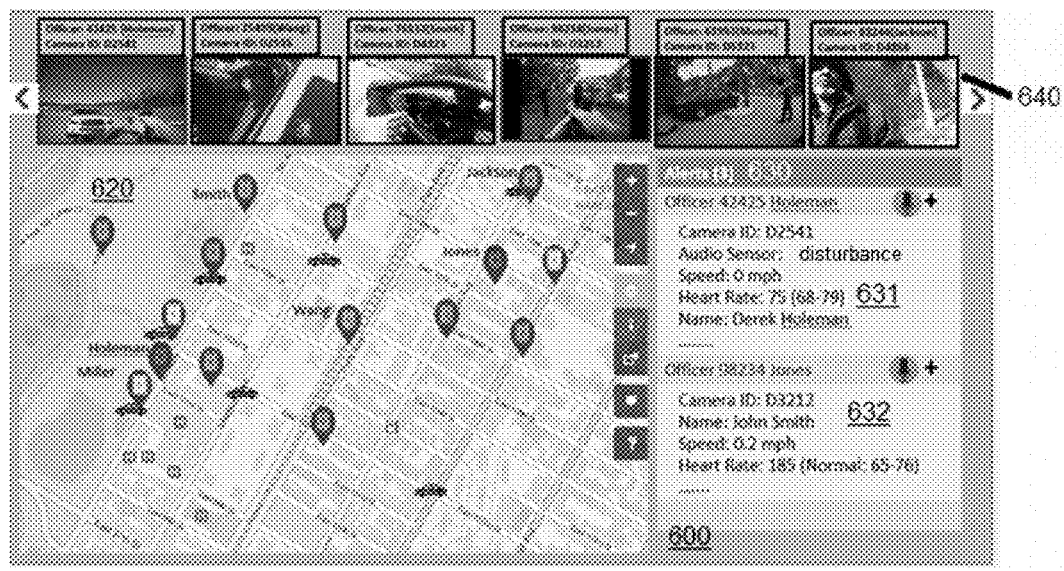
Figure 7:
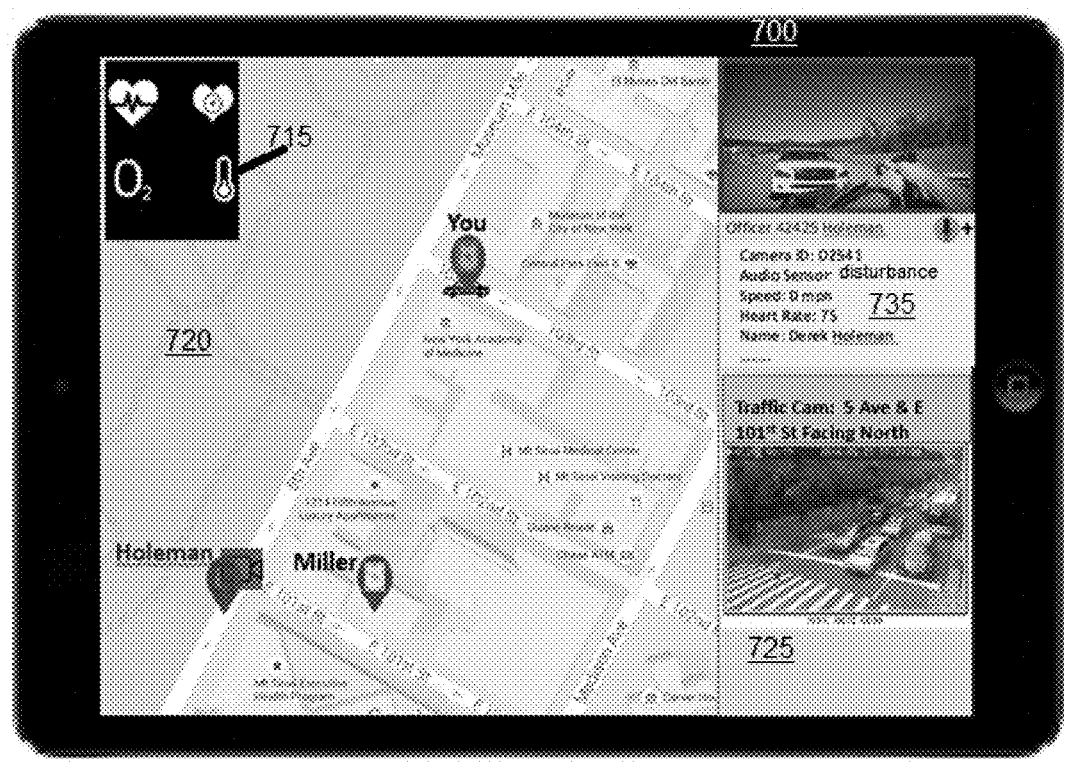

As discussed earlier, one or more programs in embodiments of the present invention can display pertinent data related to environmental conditions experienced by a given individual or individuals in graphical user interfaces before, during, and after, an event. Returning to the law enforcement example. FIGS. 5-7 are examples of how data collected by one or more body camera and sensor apparatus 110a-110n can be displayed in a dashboard as well as how it can be integrated with additional data in the display.

FIGS. 5-6 are examples of a dashboard that could be viewed by a command center. In the dashboard 500, 600 are three alerts 530 630, two of them visible. The first visible alert 531 631 is for a Derek Holeman, who has an audio sensor that perceived a disturbance. The second alert is for a John Smith 532 632, who has an accelerated heart rate, as compared to his baseline. The dashboard 500 600 shows the command center the locations of these individuals, the locations of other individuals in the vicinity, and the perspective of each individual based on his or her recording device.

Referring to FIG. 5, the dashboard 500 includes a key 510 to the officers displayed on a map 520, such that a viewer is able to determine what type of individuals are close to a given area. A portion of the dashboard also displays live feeds 540 from the cameras worn by the officers. FIG. 6 shows a dashboard 600 with a clearer view of live feeds 640.

FIG. 7 is an example of a dashboard 700 that could be viewed by another officer who may assist Derek Holeman, or by Derek Holeman himself. The screenshot shows this officer his or her location relative to Derek Holeman as well as the view from Derek Holeman's recording device 735 and a nearby traffic camera 725. Biometric readings 715 for the officer are also displayed, as indicated by the icons, blood pressure, heart rate, oxygen level, and temperature. No actual readings are displayed in this example but could appear in an embodiment of the present invention in concert with the appropriate icon.

Referring now to FIG. 8, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the computer system which is imaged during runtime by one or more programs in an embodiment of the present invention can be understood as cloud computing node 10 (FIG. 8) and if not a cloud computing node 10, then one or more general computing node that includes aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
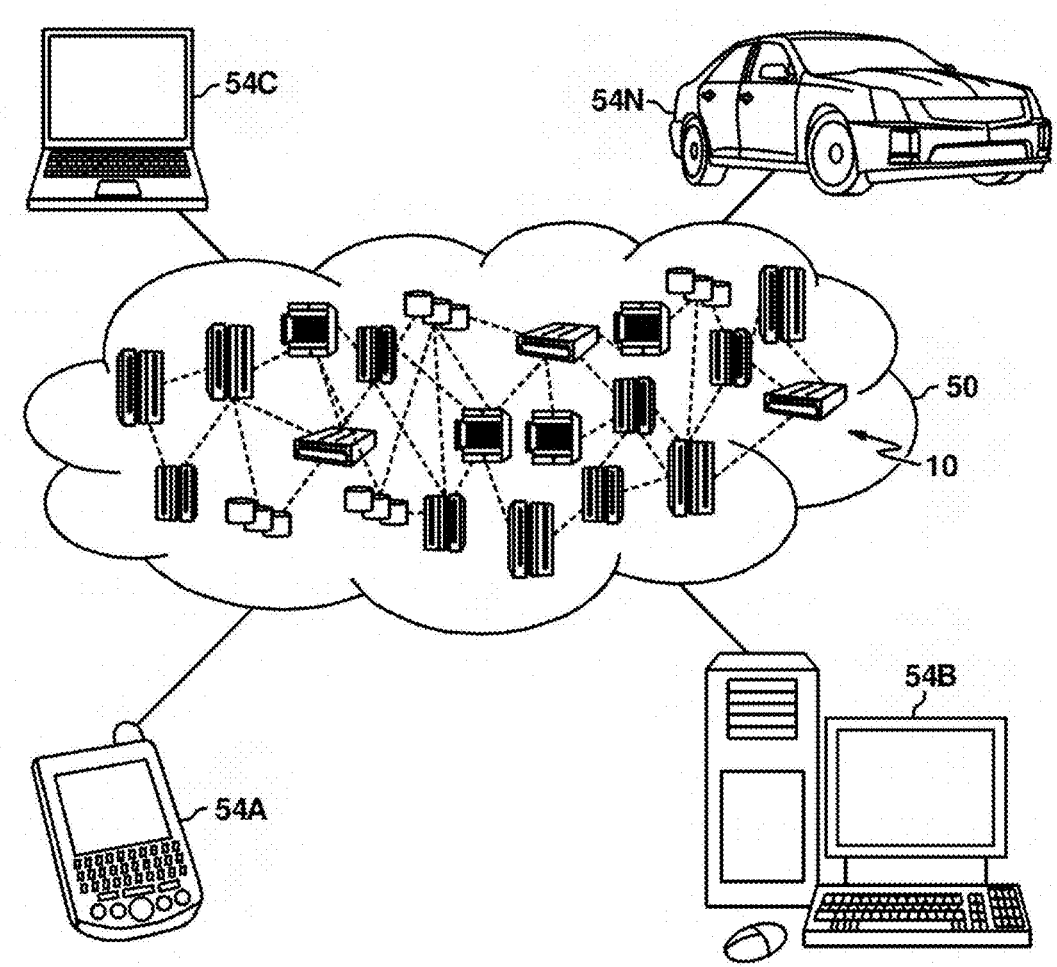
FIG. 9 depicts a cloud computing environment according to an embodiment of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
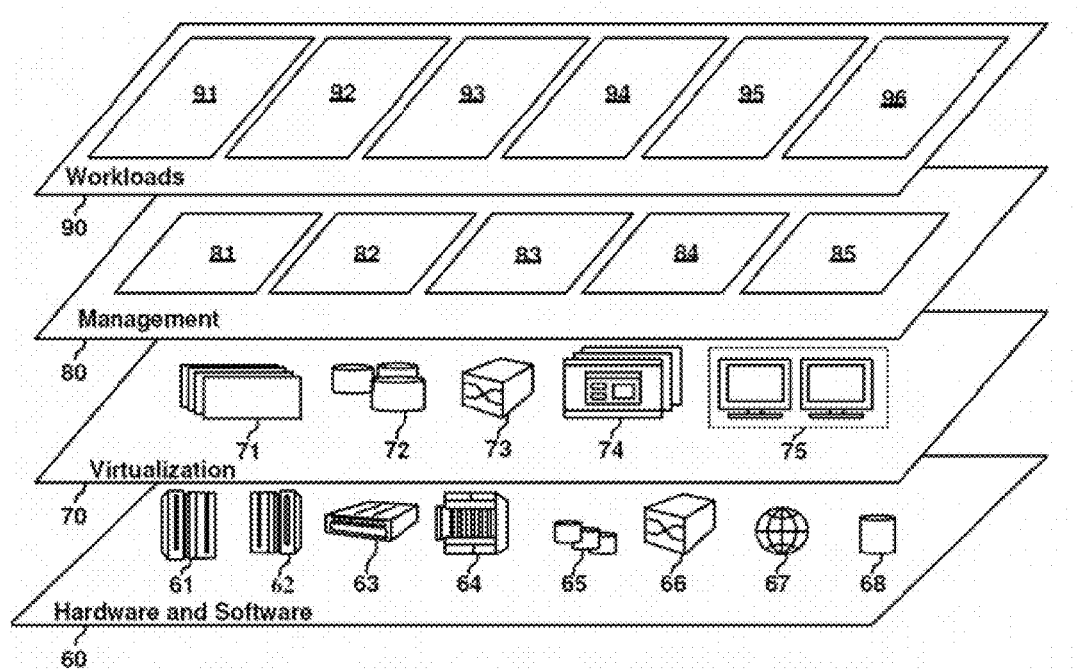
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and analyzing contemporaneous data to determine a responsive action 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
    monitoring, by one or more processors, biometric data and movements of an individual obtained from one or more sensors proximate to the individual, to establish and continuously update, a baseline state for the individual;
    obtaining, by the one or more processors, video data and audio data from a recording device worn by the individual and contemporaneous data from the one or more sensors;
    determining, by the one or more processors, based on the contemporaneous sensor data and the baseline state, that the individual is experiencing a state inconsistent with the baseline state;
    analyzing, by the one or more processors, the video data and the audio data to identify environmental factors contributing to the state inconsistent with the baseline state;
    based on identifying the environmental factors, determining, by the one or more processors, a responsive action to mitigate the environmental factors, wherein the determining the responsive action further comprises analyzing historical data in a memory to select the responsive action based on the environmental factors, wherein the historical data comprises data gathered during prior responsive actions with similar environmental factors to the environmental factors;
    initiating, by the one or more processors, the responsive action;
    monitoring, by the one or more processors, the responsive action, utilizing the recording device and the sensors; and
    retaining, by the one or more processors, data gathered during the responsive action, wherein the retaining comprises indexing the data gathered during the responsive action in the memory and updating the historical data with the data gathered during the responsive action.

2. The computer-implemented method of claim 1, wherein the initiating comprises:
    transmitting, by the one or more processors, over a network connection, to a client, a request for the responsive action; and
    configuring, by the one or more processors, the request for display in a customized graphical user interface on the client.

3. The computer-implemented method of claim 1, further comprising:
    identifying, by the one or more processors, based on the video data, the audio data, and the contemporaneous data, one or more additional individuals in a given vicinity of the individual, wherein the initiating comprises transmitting, by the one or more processors, over a network connection, to one or more clients associated with the one or more additional individual, a request for the responsive action.

4. The computer-implemented method of claim 1, wherein the biometric data comprises biometric data comprises one or more of: heart rate of the individual, body temperature of the individual, or blood pressure of the individual.

5. The computer-implemented method of claim 1, wherein the baseline state comprises a resting state and the state inconsistent with the baseline state comprises a high stress state and the determining comprises ascertaining the high stress state based on the contemporaneous data exceeding a threshold established by the baseline state.

6. The computer-implemented method of claim 1, wherein the initiating comprises:
    transmitting, by the one or more processors, over a network connection, to a client, a request for the responsive action; and
    configuring, by the one or more processors, the request for display in a customized graphical user interface on the client, the computer-implemented method further comprising:
    based on monitoring the responsive action, configuring and displaying, in the customized graphical user interface, data obtained during the response action from the recording device and the sensors.

7. The computer-implemented method of claim 1, wherein the determining the responsive action further comprises analyzing one or more of operational procedures to select the responsive action based on the environmental factors.

8. The computer-implemented method of claim 1, wherein the contemporaneous sensor data comprises additional biometric data and additional data characterizing movements of the individual, the determining that the individual is experiencing a state inconsistent with the baseline state comprising:
    analyzing, by the one or more processors, the additional biometric data to determine, based on the baseline data, if at least one biometric value in the additional biometric data is inconsistent with the baseline data; and
    based on determining that the at least one biometric value in the additional biometric data is inconsistent with the baseline data, analyzing, by the one or more processors, the additional data characterizing the movements to determine if the at least one biometric value is an outlier or if the at least one biometric value is indicative of the environmental factors.

9. A computer program product comprising:
    a computer readable storage medium readable by one or more processors and storing instructions for execution by the one or more processors for performing a method comprising:
        monitoring, by the one or more processors, biometric data and movements of an individual obtained from one or more sensors proximate to the individual, to establish and continuously update, a baseline state for the individual;
        obtaining, by the one or more processors, video data and audio data from a recording device worn by the individual and contemporaneous data from the one or more sensors;
        determining, by the one or more processors, based on the contemporaneous sensor data and the baseline state, that the individual is experiencing a state inconsistent with the baseline state;
        analyzing, by the one or more processors, the video data and the audio data to identify environmental factors contributing to the state inconsistent with the baseline state;
        based on identifying the environmental factors, determining, by the one or more processors, a responsive action to mitigate the environmental factors, wherein the determining the responsive action further comprises analyzing historical data in a memory to select the responsive action based on the environmental factors, wherein the historical data comprises data gathered during prior responsive actions with similar environmental factors to the environmental factors;
        initiating, by the one or more processors, the responsive action;
        monitoring, by the one or more processors, the responsive action, utilizing the recording device and the sensors; and
        retaining, by the one or more processors, data gathered during the responsive action, wherein the retaining comprises indexing the data gathered during the responsive action in the memory and updating the historical data with the data gathered during the responsive action.

10. The computer program product of claim 9, wherein the initiating comprises:
    transmitting, by the one or more processors, over a network connection, to a client, a request for the responsive action; and
    configuring, by the one or more processors, the request for display in a customized graphical user interface on the client.

11. The computer program product of claim 9, further comprising:
    identifying, by the one or more processors, based on the video data, the audio data, and the contemporaneous data, one or more additional individuals in a given vicinity of the individual, wherein the initiating comprises transmitting, by the one or more processors, over a network connection, to one or more clients associated with the one or more additional individual, a request for the responsive action.

12. The computer program product of claim 9, wherein the biometric data comprises biometric data comprises one or more of: heart rate of the individual, body temperature of the individual, or blood pressure of the individual.

13. The computer program product of claim 9, wherein the baseline state comprises a resting state and the state inconsistent with the baseline state comprises a high stress state and the determining comprises ascertaining the high stress state based on the contemporaneous data exceeding a threshold established by the baseline state.

14. The computer program product of claim 9, wherein the initiating comprises:
    transmitting, by the one or more processors, over a network connection, to a client, a request for the responsive action; and
    configuring, by the one or more processors, the request for display in a customized graphical user interface on the client, the computer-implemented method further comprising:
    based on monitoring the responsive action, configuring and displaying, in the customized graphical user interface, data obtained during the response action from the recording device and the sensors.

15. The computer program product of claim 9, wherein the determining the responsive action further comprises analyzing one or more of operational procedures to select the responsive action based on the environmental factors.

16. A system comprising:
    a memory;
    one or more processors in communication with the memory; and
    program instructions executable by the one or more processors via the memory to perform a method, the method comprising:
        monitoring, by the one or more processors, biometric data and movements of an individual obtained from one or more sensors proximate to the individual, to establish and continuously update, a baseline state for the individual;
        obtaining, by the one or more processors, video data and audio data from a recording device worn by the individual and contemporaneous data from the one or more sensors;
        determining, by the one or more processors, based on the contemporaneous sensor data and the baseline state, that the individual is experiencing a state inconsistent with the baseline state;
        analyzing, by the one or more processors, the video data and the audio data to identify environmental factors contributing to the state inconsistent with the baseline state;

based on identifying the environmental factors, determining, by the one or more processors, a responsive action to mitigate the environmental factors, wherein the determining the responsive action further comprises analyzing historical data in a memory to select the responsive action based on the environmental factors, wherein the historical data comprises data gathered during prior responsive actions with similar environmental factors to the environmental factors;

initiating, by the one or more processors, the responsive action;

monitoring, by the one or more processors, the responsive action, utilizing the recording device and the sensors; and retaining, by the one or more processors, data gathered during the responsive action, wherein the retaining comprises indexing the data gathered during the responsive action in the memory and updating the historical data with the data gathered during the responsive action.

* * * * *